Oct. 11, 1932.                G. W. PIERCE                1,882,394
                        MAGNETOSTRICTIVE VIBRATOR
                     Original Filed March 23, 1928
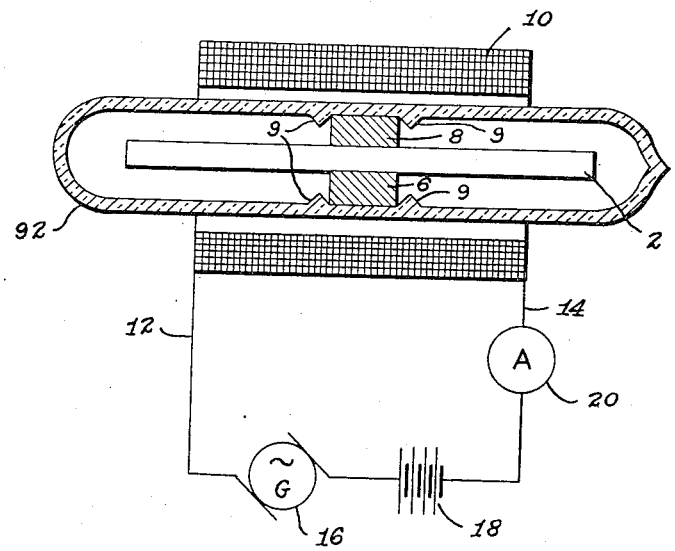
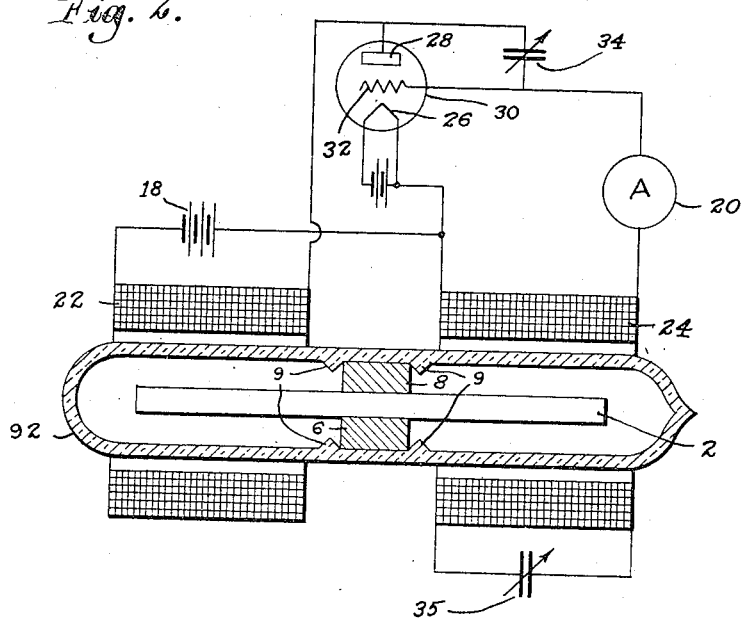
Inventor
George W. Pierce
by David Rines
        Attorney Patented Oct. 11, 1932

1,882,394

UNITED STATES PATENT OFFICE

GEORGE WASHINGTON PIERCE, OF CAMBRIDGE, MASSACHUSETTS

MAGNETOSTRICTIVE VIBRATOR

Original application filed March 23, 1928, Serial No. 264,222. Divided and this application filed August 22, 1932. Serial No. 629,840.

The present invention relates to magnetostrictive vibrators. The present application is a division of application Serial No. 264,222, filed March 23, 1928, and a continuation in part of application Serial No. 158,452, filed January 3, 1928, which matured, on March 11, 1930, into Letters Patent No. 1,750,124.

A magnetostrictive vibrator comprises a magnetostrictive core disposed in an electromagnetic field, such as may be established by passing an electric current through a field coil or winding. The core may be in the form of a rod or tube, or any other desired form. Any material having suitable properties may be used for the core, but the material should obviously be characterized by comparatively large magnetostrictive effects and comparatively low vibrational decrement.

The chief object of the present invention is to provide a new and improved magnetostrictive vibrator.

Other objects will be explained hereinafter and will be particularly pointed out in the appended claims, it being understood that it is intended to set forth, by suitable expression in the claims, all the novelty that the invention may possess.

The invention will be explained in greater detail in connection with the accompanying drawing, in which Fig. 1 is a diagrammatic view of a magnetostrictive vibrator embodying the present invention; and Fig. 2 is a similar view, illustrating the invention as applied to a vacuum-tube oscillator.

A magnetostrictive core is shown in Fig. 1 axially positioned within, and driven by a solenoid field coil or winding 10. The coil 10 is provided with conductors 12 and 14 by which it may be connected, for simplicity, in series with a source of alternating electromotive force, such as an alternating-current generator 16. A local battery 18 (shown in series with the source 16 and the winding 10) applies a steady magnetizing or polarizing field to the core, over which the alternating field produced by the generator 16 is superposed. The core may be held centrally in place between clamps 6 and 8 so as freely to vibrate longitudinally about a nodal point at its center. Further details will be found in the above-mentioned Letters Patent.

If the current or voltage is alternating, the electromagnetic field created thereby will also be alternating. The core 2 will, therefore, increase and decrease in length (let us say) many times a second. The core 2 will, in consequence, vibrate mechanically by magnetostriction about a nodal point at its center with a period of vibration equal to the period of the alternating electromotive force. The mechanical damping of the rod, mounted as shown, is as small as possible, with the result that the resonant response of the core is very sharp and pronounced.

When vibrating at its fundamental frequency, the two halves of the centrally supported core are driven by equal and oppositely acting forces, so as to communicate practically no motion to the clamp and its base. The apparatus is, therefore, free from one of the sources of trouble and irregularity of tuning forks, the periods of vibration of which are affected by the table or other support on which they are placed.

Any material having suitable properties may, of course, be used for the vibrating body 2, but it should obviously be constituted of material that is suitably magnetizable. The core may be in the form of a simple rod or tube of the proper material, or it may have any other desired form, as stated in the said Letters Patent.

The frequency of a particular mode of vibration of a rod or bar is determined by its elasticity, length and density. For some modes of vibration, the frequency is affected also by the width, thickness, radius, and the like of the rod or bar. The frequency of a magnetostrictive vibrator of this character is also affected by the fact that the vibrator reacts upon the air, communicating motion thereto. The vibrating air thus propagated from the surface of the vibrator, in turn, reacts on the vibrator to dampen its vibrations. The freedom of vibration of the vibrator is thus interfered with and its vibration is thereby modified slightly, thereby affecting its frequency. Such frequency variation, furthermore, is never the same, depending upon the velocity of the air vibrations which, in their turn, depend upon the temperature and other conditions of the air.

According to the present invention, therefore, the vibrator may be enclosed in a chamber, shown as a preferably transparent vessel 92, which may be partly or wholly evacuated. The clamps 6 and 8 are held in place between lugs 9. The chamber walls may surround the vibrator and be enclosed in the coil 10, without any connecting wires leading into the enclosure. The vacuum reduces the before-described damping and it also obviates rusting and accumulation of dust, so that the constancy of vibration is thus preserved for precision work. Changes of air temperature, furthermore, have less effect upon changes in the dimensions of the vibrator, thereby further contributing to constancy of frequency. Also the container 92 eliminates the annoyance of sound radiation, when the device is used for electrical purposes in the audible range.

The frequencies may be changed at will by merely pulling out one vessel 92, containing one core 2, and replacing it by another vessel having another core of different frequency.

The vibrator may be used for many purposes, such as a transformer to couple several circuits together in order to transmit energy from one circuit to another at a given frequency. When an alternating current of the critical frequency flows in one circuit, it will cause the vibrator to vibrate energetically and thus transmit energy to the other circuit. Thus, in the system of Fig. 2, the core 2 is positioned axially of a magnetic field, here shown as produced by the coils 22 and 24. For symmetry, one of the coils is positioned on one side of the middle of the core 2 and the other on the other side. The coil 22 is connected, in series with the local battery 18, between the filament or cathode 26 and the plate or anode 28, in the output or plate circuit of a vacuum tube 30. The coil 24 is similarly connected in the input or grid circuit of the tube, between the filament 26 and the grid or third electrode 32. The coils 22 and 24 thus form electrical paths between the plate, and between the filament and the grid, respectively. The grid and the plate may, if desired, be spanned by a variable condenser 34; or a tuning condenser 35 may be connected in parallel with one or the other of the coils 22 and 24; or, if the coils are suitably designed, the condenser may be omitted altogether. An electric vacuum-tube oscillator is thus provided, as explained in the said Letters Patent No. 1,750,124.

To persons skilled in the art many other applications and modifications of the apparatus will occur, and no effort has here been made to be exhaustive.

What is claimed is:

1. Apparatus of the character described comprising a vessel, a support within the vessel, a magnetostrictive vibrator freely supported on the support in the vessel, and a coil cooperatively related to the vibrator, the relation between the coil and the vibrator being such that the current flowing through the coil is subjected to the reaction of the vibrator due to magnetostrictive effects.

2. Apparatus of the character described comprising a vessel, a support within the vessel, and a magnetostrictive vibrator freely supported centrally on the support in the vessel so as to vibrate symmetrically about its center.

3. Apparatus of the character described comprising a vessel having lugs, a plurality of clamps held within the vessel between the lugs, a magnetostrictive vibrator freely clamped centrally between the clamps in the vessel so as to vibrate symmetrically about its center, and a winding for the vibrator and within which the vesesl is contained.

In testimony whereof, I have hereunto subscribed my name.

GEORGE W. PIERCE.